US009088598B1

(12) United States Patent
Zhang et al.

(10) Patent No.: US 9,088,598 B1
(45) Date of Patent: Jul. 21, 2015

(54) SYSTEMATIC MINING OF ASSOCIATED SERVER HERDS FOR UNCOVERING MALWARE AND ATTACK CAMPAIGNS

(71) Applicant: Narus, Inc., Sunnyvale, CA (US)

(72) Inventors: Jialong Zhang, College Station, TX (US); Sabyasachi Saha, Sunnyvale, CA (US); Guofei Gu, College Station, TX (US); Sung-Ju Lee, Redwood City, CA (US); Bruno Nardelli, Sunnyvale, CA (US)

(73) Assignee: Narus, Inc., Sunnyvale, CA (US)

( * ) Notice: Subject to any disclaimer, the term of this patent is extended or adjusted under 35 U.S.C. 154(b) by 63 days.

(21) Appl. No.: 14/080,225

(22) Filed: Nov. 14, 2013

(51) Int. Cl.
*G06F 21/50* (2013.01)
*H04L 29/06* (2006.01)

(52) U.S. Cl.
CPC .................................. *H04L 63/1408* (2013.01)

(58) Field of Classification Search
CPC ...... H04L 63/14; H04L 63/1408; G06F 21/50
USPC .......................................................... 726/22
See application file for complete search history.

(56) References Cited

U.S. PATENT DOCUMENTS

| | | | | |
|---|---|---|---|---|
| 6,167,446 | A * | 12/2000 | Lister et al. | 709/223 |
| 6,711,615 | B2 * | 3/2004 | Porras et al. | 709/224 |
| 2002/0194505 | A1 * | 12/2002 | Muschenborn | 713/201 |
| 2004/0199576 | A1 * | 10/2004 | Tan | 709/203 |
| 2009/0254971 | A1 * | 10/2009 | Herz et al. | 726/1 |
| 2012/0089845 | A1 * | 4/2012 | Raleigh | 713/176 |

OTHER PUBLICATIONS

Li, Zhou, et al., "Finding the Linchpins of the Dark Web: a Study on Topologically Dedicated Hosts on Malicious Web Infrastructures", IEEE Symposium on Security and Privacy, May 2013, pp. 112-126.
Yen, Ting-Fang, et al., "Traffic Aggregation for Malware Detection", 2008, pp. 207-227.
Konte, Maria, et al., "Dynamics of Online Scam Hosting Infrastructure", Proc Passive and Actice Measurement Conference (PAM), Apr. 2009.
Gu, Guofei, et al., "BotMiner: Clustering Analysis of Network Traffic for Protocol-and Structure-Independent Botnet Detection", 17th USENIX Security Symposium, 2008, pp. 139-154.

* cited by examiner

*Primary Examiner* — William Powers
(74) *Attorney, Agent, or Firm* — Kwan & Olynick LLP

(57) ABSTRACT

A method for detecting malicious servers. The method includes analyzing network traffic data to generate a main similarity measure and a secondary similarity measure for each server pair found in the network traffic data, extracting a main subset and a secondary subset of servers based on the main similarity measure and the secondary similarity measure, identifying a server that belongs to the main subset and the secondary subset, and determining a suspicious score of the server based on at least a first similarity density measure of the main subset, a second similarity density measure of the secondary subset, and a commonality measure of the main subset and the secondary subset.

20 Claims, 8 Drawing Sheets

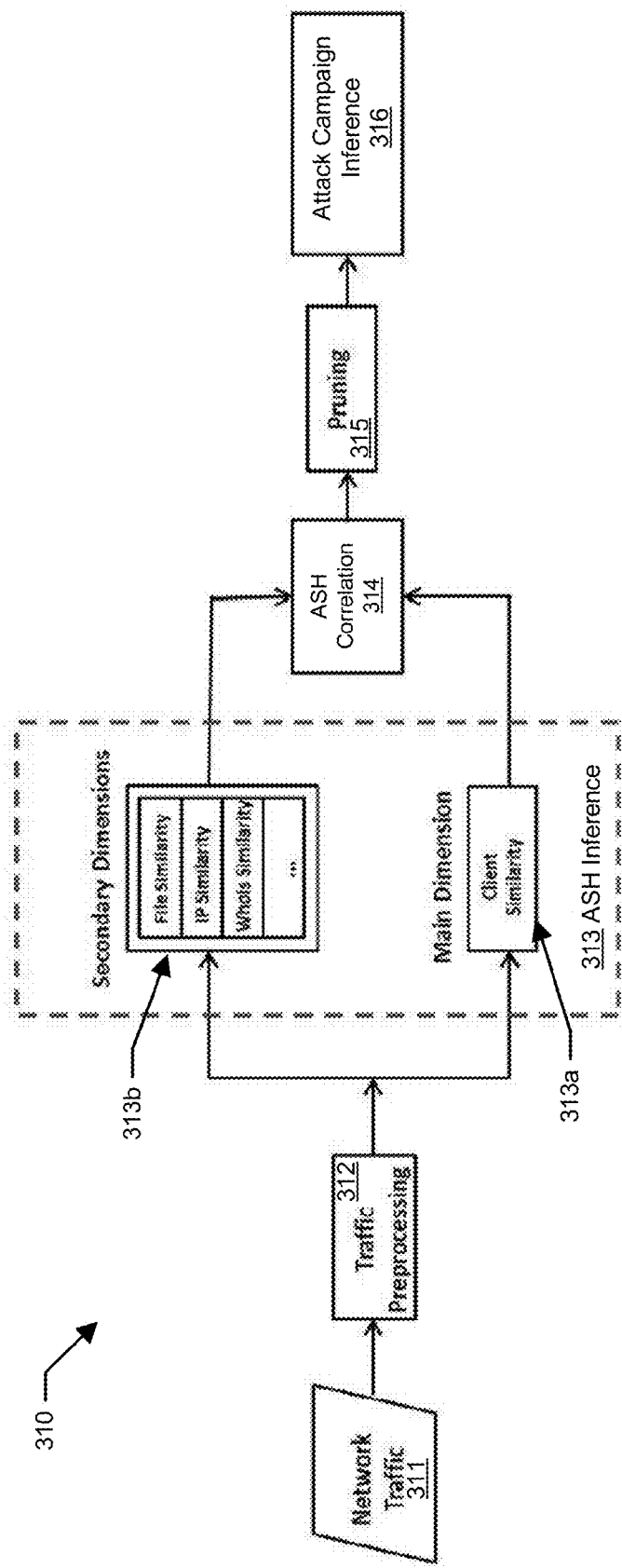
FIG. 3.1

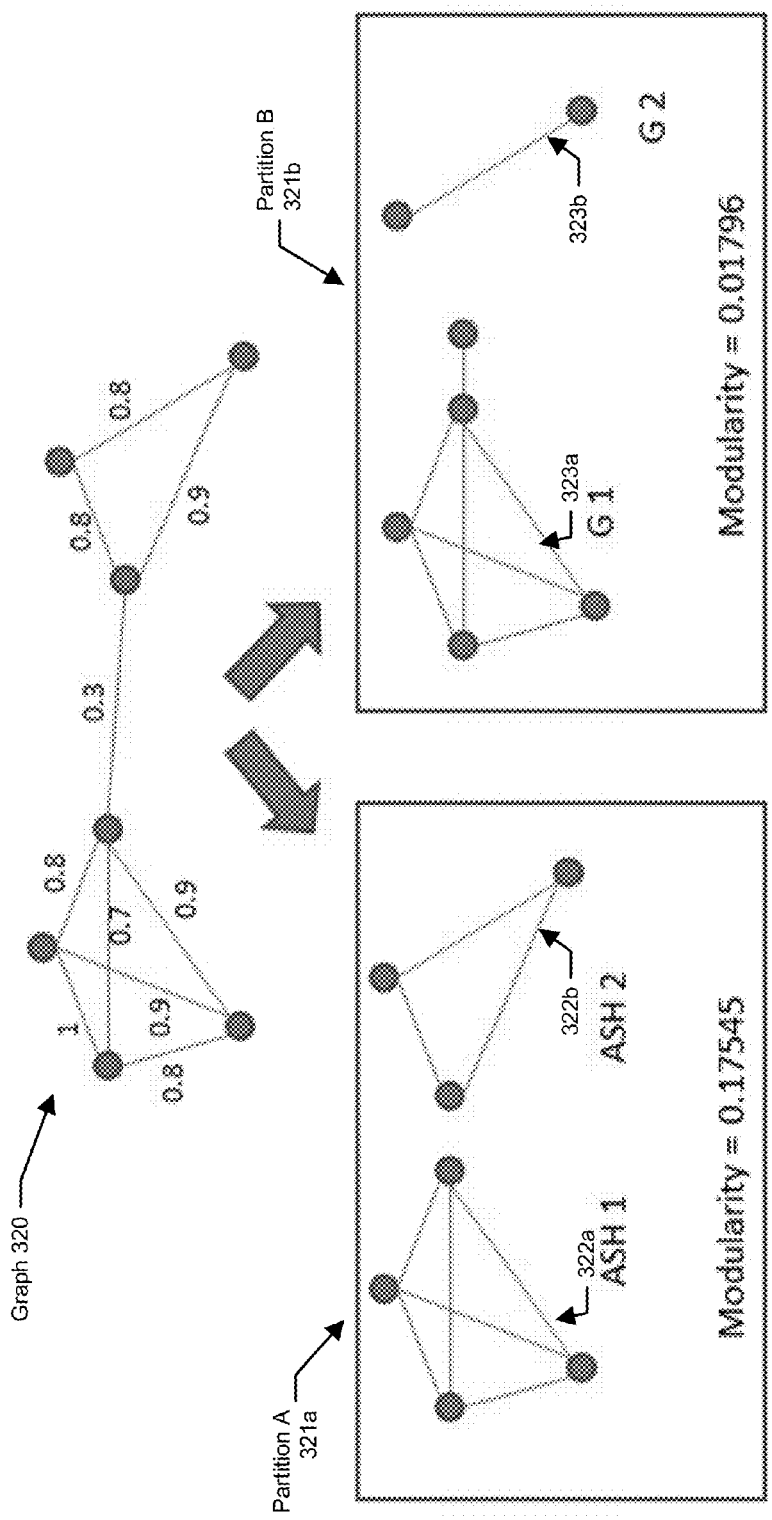
FIG. 3.2

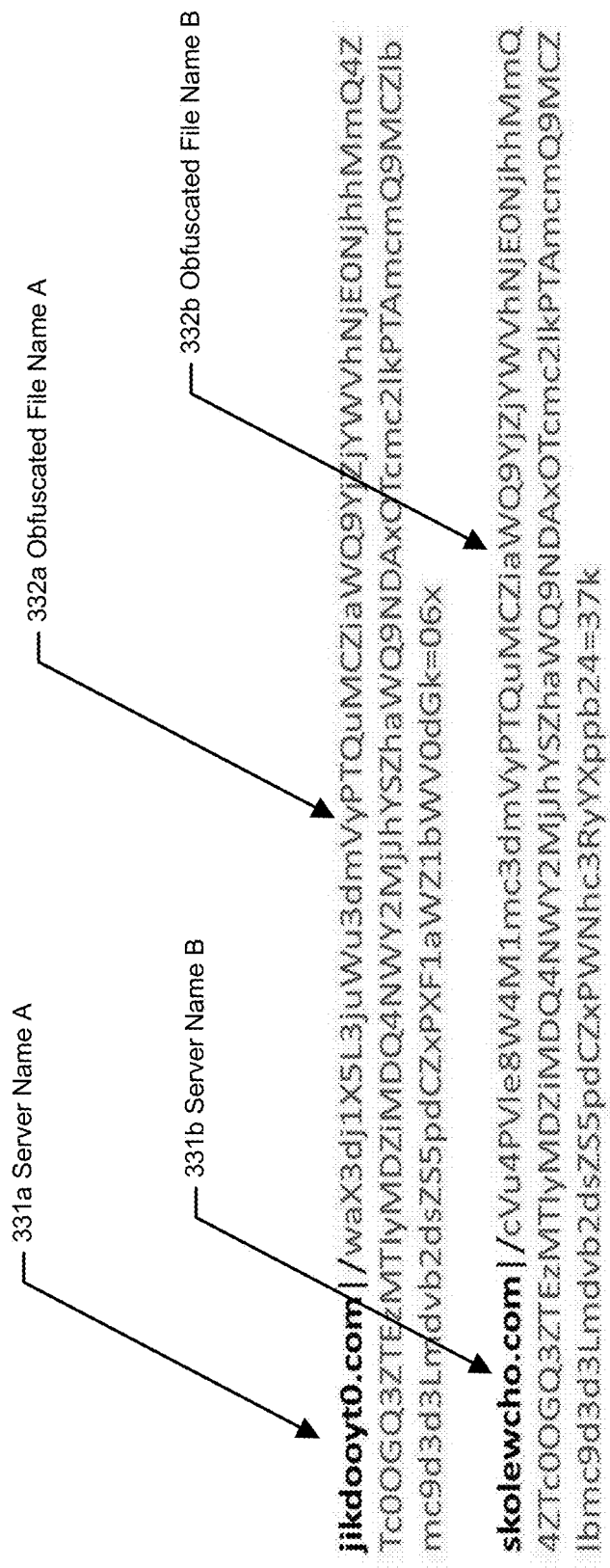
FIG. 3.3

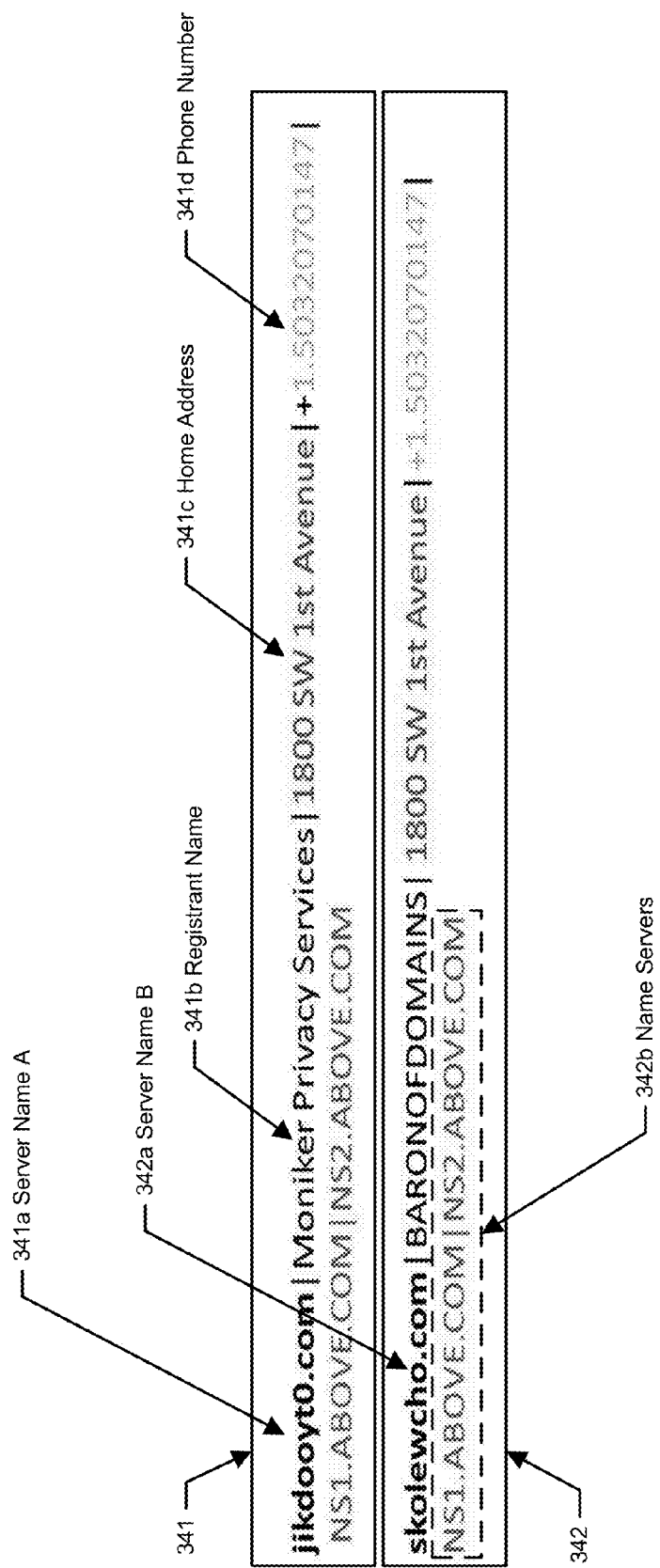
FIG. 3.4

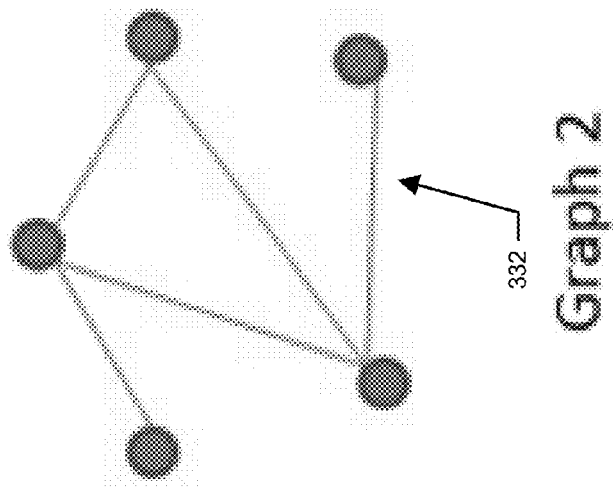
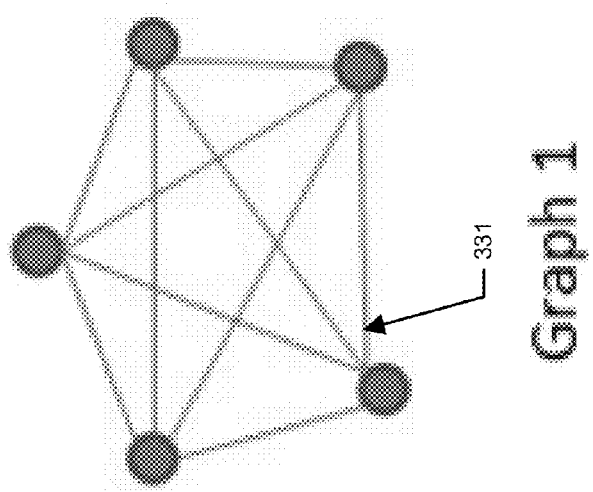
FIG. 3.5

SYSTEMATIC MINING OF ASSOCIATED SERVER HERDS FOR UNCOVERING MALWARE AND ATTACK CAMPAIGNS

BACKGROUND OF THE INVENTION

HTTP protocol has become a popular channel for malware to either communicate with malicious servers (e.g., Command & Control (C&C), Drive-by-Download, and dropzone) or attack other benign servers. Through sending HTTP requests, malware can easily disguise itself under a large mount of benign HTTP traffics. Thus, finding those malicious HTTP activities is an error-prone process. Most of existing work detects those malware activities by analyzing the reputation of each domain that malware connected to in isolation.

SUMMARY

In general, in one aspect, the present invention relates to a method for detecting malicious servers. The method includes analyzing, by a processor of a computer system, network traffic data to generate a main similarity measure for each server pair of a plurality of servers found in the network traffic data, wherein the main similarity measure represents first similarity between two servers of the server pair based on a plurality of clients found in the network traffic data that communicate to both of the two servers using at least a portion of the network traffic data, extracting, by the processor and based on a first pre-determined algorithm, a main subset representing a portion of the plurality of servers based on the main similarity measure, analyzing, by the processor, the network traffic data to generate a plurality of secondary similarity measures for each server pair of the plurality of servers, wherein a secondary similarity measure of the plurality of secondary similarity measures represents second similarity between the two servers of the server pair based on a pre-determined criterion, extracting, by the processor and based on a second pre-determined algorithm, a secondary subset representing another portion of the plurality of servers based on the secondary similarity measure, identifying a server of the plurality of servers that belongs to the main subset and the secondary subset, and determining, by the processor, a suspicious score of the server based on at least a first similarity density measure of the main subset, a second similarity density measure of the secondary subset, and a commonality measure of the main subset and the secondary subset.

In general, in one aspect, the present invention relates to a system for detecting malicious servers. The system includes a processor of a computer system, memory comprising instructions executable by the processor, wherein the instructions comprises (i) a main similarity analyzer configured to analyze network traffic data to generate a main similarity measure for each server pair of a plurality of servers found in the network traffic data, wherein the main similarity measure represents first similarity between two servers of the server pair based on a plurality of clients found in the network traffic data that communicate with both of the two servers using at least a portion of the network traffic data, and extract, based on a first pre-determined algorithm, a main subset representing a portion of the plurality of servers based on the main similarity measure, (ii) a secondary similarity analyzer configured to analyze the network traffic data to generate a plurality of secondary similarity measures for each server pair of the plurality of servers, wherein a secondary similarity measure of the plurality of secondary similarity measures represents second similarity between the two servers of the server pair based on a pre-determined criterion, and extract, based on a second pre-determined algorithm, a secondary subset representing another portion of the plurality of servers based on the secondary similarity measure, and (iii) a correlation analyzer configured to identify a server of the plurality of servers that belongs to the main subset and the secondary subset, and determine a suspicious score of the server based on at least a first similarity density measure of the main subset, a second similarity density measure of the secondary subset, and a commonality measure of the main subset and the secondary subset, and (iv) a repository configured to store the main subset, the secondary subset, the first similarity density measure of the main subset, the second similarity density measure of the secondary subset, and the commonality measure of the main subset and the secondary subset.

In general, in one aspect, the present invention relates to a computer readable medium storing instructions, when executed by the computer to detect malicious servers, the instructions include functionality for analyzing network traffic data to generate a main similarity measure for each server pair of a plurality of servers found in the network traffic data, wherein the main similarity measure represents first similarity between two servers of the server pair based on a plurality of clients found in the network traffic data that communicate to both of the two servers using at least a portion of the network traffic data, extracting, based on a first pre-determined algorithm, a main subset representing a portion of the plurality of servers based on the main similarity measure, analyzing the network traffic data to generate a plurality of secondary similarity measures for each server pair of the plurality of servers, wherein a secondary similarity measure of the plurality of secondary similarity measures represents second similarity between the two servers of the server pair based on a pre-determined criterion, extracting, based on a second pre-determined algorithm, a secondary subset representing another portion of the plurality of servers based on the secondary similarity measure, identifying a server of the plurality of servers that belongs to the main subset and the secondary subset, and determining a suspicious score of the server based on at least a first similarity density measure of the main subset, a second similarity density measure of the secondary subset, and a commonality measure of the main subset and the secondary subset.

Other aspects and advantages of the invention will be apparent from the following description and the appended claims.

BRIEF DESCRIPTION OF DRAWINGS

FIGS. 3.1-3.5 show various examples according to aspects of the invention.

DETAILED DESCRIPTION

Figure 1:
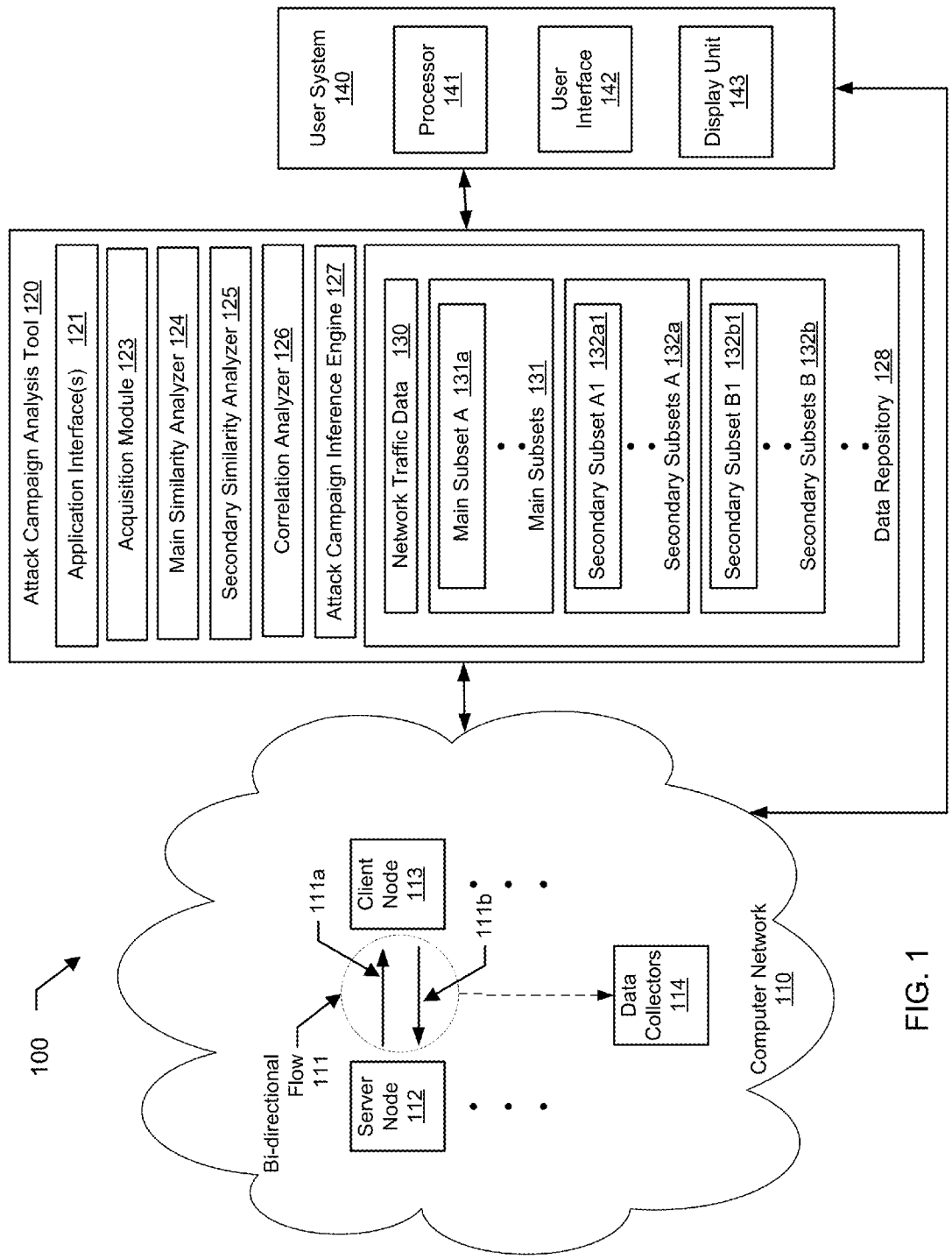
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Through-out this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

Generally, embodiments of the invention provide a system and method to detect multiple servers that collectively engage in a coordinated malicious activity (referred to as an attack campaign) as a group. In or more embodiments of the invention, the group of servers are detected by analyzing and relationships among servers found in the network traffic data based on multiple similarity measures of server pairs. For example, an attacker of the attack campaign may control multiple servers as backup servers or step-by-step exploit servers, which leads to strong connection among those servers. In addition, the benign servers connected by malware may be also be involved in malware activities.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network attack campaign analysis tool (120), a user system (140), and a computer network (110). The network attack campaign analysis tool (120) includes data repository (128), one or more application interfaces (121), acquisition module (123), main similarity analyzer (124), secondary similarity analyzer (125), correlation analyzer (126), and attack campaign inference engine (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the network (110).

As shown in FIG. 1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) is referred to as being generated by the application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113).

In one or more embodiments, certain device(s) (e.g., data collectors (114)) within the computer network (110) may be configured to collect network data (e.g., bi-directional flow (111)) for providing to the network attack campaign analysis tool (120). Each of these components is described below. One of ordinary skill in the art will appreciate that embodiments are not limited to the configuration shown in FIG. 1.

In one or more embodiments of the invention, the network attack campaign analysis tool (120) is configured to interact with the computer network (110) using one or more of the application interface(s) (121). The application interface (121) may be configured to receive data (e.g., bi-directional flow (111)) from the computer network (110) and/or store received data to the data repository (128). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network attack campaign analysis tool (120).

In one or more embodiments, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the network attack campaign analysis tool (120). The analyst user may include, but is not limited to, an individual, a group, an organization, or some other entity having authority and/or responsibility to access the network attack campaign analysis tool (120). Specifically, the context of the term "analyst user" here is distinct from that of a user of the computer network (110). The user system (140) may be, or may contain a form of, an internet-based communication device that is capable of communicating with the application interface (121) of the network attack campaign analysis tool (120). Alternatively, the network attack campaign analysis tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network attack campaign analysis tool (120) (e.g., report, alert, etc.).

As shown, communication links are provided between the network attack campaign analysis tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network attack campaign analysis tool (120), the user system (140), and the communication links may be part of the computer network (110).

In one or more embodiments, a central processing unit (CPU, not shown) of the network attack campaign analysis tool (120) is configured to execute instructions to operate the components of the network attack campaign analysis tool (120). In one or more embodiments, the memory (not shown) of the network attack campaign analysis tool (120) is configured to store software instructions for performing the functionality of the network attack campaign analysis tool (120). The memory may be one of a variety of memory devices, including but not limited to random access memory (RAM), read-only memory (ROM), cache memory, and flash memory. The memory may be further configured to serve as back-up storage for information stored in the data repository (128).

The network attack campaign analysis tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network attack campaign analysis tool (120) is configured to obtain and store data in the data repository (128). In one or more embodiments, the data repository (128) is a persistent storage device (or set of devices) and is configured to receive data from the computer network (110) using the application interface (121). The data repository (128) is also configured to deliver working data to, and receive working data from, the acquisition module (123), main similarity analyzer (124), secondary similarity analyzer (125), and attack campaign inference engine (126). The data repository (128) may be a data store (e.g., a database, a file system, one or more data structures configured in a memory, some other medium for storing data, or any suitable combination thereof), which may include information (e.g., network traffic data (130), main subsets (131) with associated similarity density measures, secondary subset A (132a) with associated similarity density measures, secondary subset B (132b) with associated similarity density measures, commonality measure of the main subset (131) and the secondary subset A (132a), secondary subset B (132b), etc.) related to the attack campaign analysis. The data repository (128) may be a device internal to the network attack campaign analysis tool (120). Alternatively, the data repository (128) may be an external storage device operatively connected to the network attack campaign analysis tool (120).

In one or more embodiments, the network attack campaign analysis tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network attack campaign analysis tool (120) is configured to support various data formats provided by the user system (140).

In one or more embodiments, the network attack campaign analysis tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as the network traffic data (130), etc. In one or more embodiments of the invention, the network traffic data (130) includes HTTP traffic data.

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the network attack campaign analysis tool (120) includes a main similarity analyzer (124) that is configured to analyze the network traffic data (130) to generate a main similarity measure for each server pair of all servers found in the network traffic data (130). In particular, any combination of two servers is referred to as a server pair. Specifically, the main similarity measure represents similarity between two servers of the server pair based on clients that communicate with both of the two servers as found in the network traffic data (130). Based on the main similarity measure, the servers found in the network traffic data (130) are partitioned into one or more clusters using a pre-determined algorithm, such as a clustering algorithm or a community detection algorithm. In particular, each of these clusters is referred to as a main subset (e.g., main subset A (131a)) representing a portion of the servers found in the network traffic data (130). Accordingly, all of these clusters are collectively referred to as the main subsets (131). In one or more embodiments, the main similarity measure is referred to as the main dimension, and the main subsets (131) are referred to as from the main dimension. In other words, the servers found in the network traffic data (130) may be partitioned into a single set of main subsets (i.e., main subsets (131)).

In one or more embodiments of the invention, the network attack campaign analysis tool (120) includes a secondary similarity analyzer (125) that is configured to analyze the network traffic data (130) to generate one or more secondary similarity measures for each server pair of all servers found in the network traffic data (130). Specifically, each secondary similarity measure represents similarity between two servers of the server pair based on a pre-determined type of similarity, such as file similarity, IP similarity, domain registration similarity, etc. Based on each secondary similarity measure, the servers found in the network traffic data (130) are partitioned into one or more clusters using a pre-determined algorithm, such as a clustering algorithm or a community identifying algorithm. In particular, each cluster is referred to as a secondary subset (e.g., secondary subset A1 (132a1), secondary subset B1 (132b1)) representing a portion of the servers found in the network traffic data (130). Accordingly, all clusters based on a particular secondary similarity measure are collectively referred to as secondary subsets (e.g., secondary subsets A (132a), secondary subsets B (132b), or other secondary subsets). In one or more embodiments, each secondary similarity measure is referred to as a secondary dimension, and the secondary subsets (e.g., secondary subsets A (132a), secondary subsets B (132b), or other secondary subsets) based on a particular secondary similarity measure are referred to the secondary subsets from the particular secondary dimension. Accordingly, the servers found in the network traffic data (130) may be partitioned in multiple ways into multiple sets of secondary subsets (e.g., secondary subsets A (132a), secondary subsets B (132b), and other secondary subsets) corresponding to the multiple secondary dimensions (e.g., file similarity, IP similarity, domain registration similarity, etc.).

In one or more embodiments of the invention, the network attack campaign analysis tool (120) includes a correlation analyzer (126) that is configured to identify a server in an intersection of the main subset A (131a) and the secondary subset A1 (132a1), and to determine a suspicious score of the server based on at least a similarity density measure of the main subset A (131a), a similarity density measure of the secondary subset A1 (132a1), and a commonality measure of the main subset A (131a) and the secondary subset A1 (132a1). Two servers with a main similarity measure (or secondary similarity measure) that exceeds a pre-determined threshold are said to have a similarity relationship. Accordingly, the similarity density measure of the main subset A (131a) (or the secondary subset A1 (132a1)) represents how many similarity relationships, relative to all possible similarity relationships, exist in the main subset A (131a) (or the secondary subset A1 (132a1)). For example, a number of all possible similarity relationships may equal the number of server pairs in the main subset A (131a) (or the secondary subset A1 (132a1)).

In one or more embodiments of the invention, the network attack campaign analysis tool (120) includes an attack campaign inference engine (127) that is configured to determine, based at least on the suspicious score of the server in the joint set of the main subset A (131a) and the secondary subset A1 (132a1) that is joint set is an associated group of the malicious servers collectively engaging in a malicious HTTP activity.

Additional details of generating the main similarity measure and partitioning the servers to extract the main subsets, generating the secondary similarity measures and partitioning the servers to extract the secondary subsets based on each secondary similarity measure, determining suspicious scores of one or more servers, and detecting associated group of the malicious servers are described in reference to FIGS. 2 and 3.1 through 3.5 below.

Figure 2:
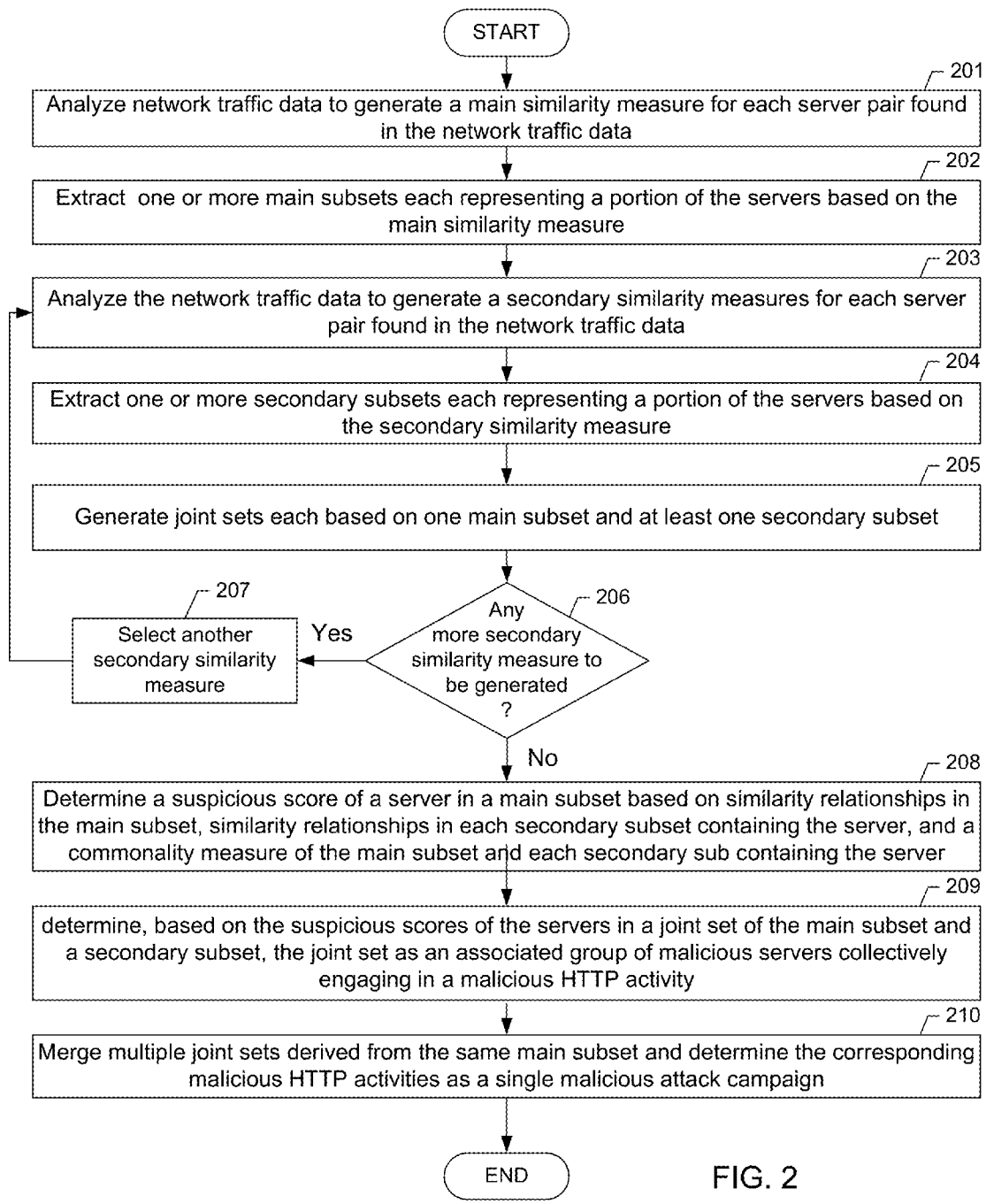
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, the network traffic data is analyzed to generate a main similarity measure for each server pair found in the network traffic data. Specifically, the main similarity measure represents similarity between two servers of the server pair based on clients in the network that communicate to both of the two servers. For example, the communication may be found in the network traffic data. In one or more embodiments of the invention, the network traffic data includes HTTP traffic data.

In Step 202, a main subset representing a portion of the servers is extracted based on the main similarity measure using a pre-determined algorithm, such as a clustering algorithm or a community identifying algorithm. In one or more embodiments of the invention, the main subset is extracted by partitioning a communication graph having nodes representing the servers and edges each weighted by the main similarity measure of a corresponding server pair. In one or more embodiments, the clustering algorithm or community identifying algorithm is a graph partitioning algorithm for partitioning the communication graph to generate one or more clusters by maximizing a quality measure of the partitioning. For example, the quality measure may be the modularity metric of weighted graph partition algorithm known to those skilled in the art. In the weighted graph partition algorithm, the modularity metric is based on edge weights of the weighted graph (i.e., the communication graph), which corresponds to the main similarity measure of a corresponding server pair. In particular, the main subset is one of the cluster(s) generated by the weighted graph partitioning.

In Step 203, the network traffic data is analyzed to generate a secondary similarity measure for each server pair of all servers found in the network traffic data. Specifically, the secondary similarity measure represents similarity between two servers of the server pair based on a pre-determined type of similarity, such as file similarity, IP similarity, domain registration similarity, etc.

In Step 204, based on the secondary similarity measure, the servers found in the network traffic data are partitioned into one or more clusters using a pre-determined algorithm. In particular, each cluster is referred to as a secondary subset representing a portion of the servers found in the network traffic data. In one or more embodiments, each secondary subset is extracted by partitioning, using the aforementioned clustering algorithm or community identifying algorithm, a weighted graph having nodes representing the servers and edges each weighted by the secondary similarity measure of a corresponding server pair. Accordingly, all clusters based on the secondary similarity measure are collectively referred to as the secondary subsets based on the secondary similarity measure. In one or more embodiments, the secondary similarity measure is referred to as a secondary dimension, and the secondary subsets based on the secondary similarity measure are referred to the secondary subsets from the secondary dimension.

In Step 205, one or more joint sets are generated based on one main subset and at least one secondary subset from the secondary dimension. In one or more embodiments, a joint set is generated from each combination of multiple main subsets and multiple secondary subsets.

In Step 206, a determination is made as to whether there is any other secondary similarity measure to be generated. If the determination is positive, i.e., there is at least one more secondary similarity measure remains to be generated, the method proceeds to Step 207 where one of the remaining secondary similarity measure is selected before returning to Step 203. If the determination is negative, i.e., there is no more secondary similarity measure left to be generated, the method proceeds to Step 208.

Based on the iteration of Step 203 through Step 206, the servers found in the network traffic data may be partitioned in multiple ways into multiple sets of secondary subsets corresponding to the multiple secondary dimensions (e.g., file similarity, IP similarity, domain registration similarity, etc.).

In Step 208, a suspicious score of a server in a main subset is determined based on similarity relationships in the main subset, similarity relationships in each secondary subset containing the server, and a commonality measure of the main subset and each secondary subset containing the server. In one or more embodiments, a measure of the similarity relationships in the main subset is referred to as the similarity density measure of the main subset, a measure of the similarity relationships in a secondary subset is referred to as the similarity density measure of the secondary subset, and the commonality measure of the main subset and the secondary subset is based on a size of the joint set derived from the main subset and the secondary subset.

In one or more embodiments, each joint set containing the server and derived from the main subset and a secondary subset contributes to a portion of the suspicious score. For example, the portion may be proportional to the similarity density measure of the main subset, the similarity density measure of the secondary subset, and the size of the joint set.

In Step 209, based on the suspicious scores of servers in a joint set, the joint set is determined as an associated group of the malicious servers collectively engaging in a malicious HTTP activity. In one or more embodiments, such determination is based on how many servers in the joint set having the suspicious score exceeding a pre-determined threshold.

In Step 210, multiple joint sets derived from the same main subset are merged into an aggregate joint set. Accordingly, the corresponding malicious HTTP activities of these joint sets are determined as a single malicious attack campaign.

FIGS. 3.1-3.5 show various examples in accordance with aspects of the invention. The examples described in FIGS. 3.1-3.5 may be based on the system (100) described in reference to FIG. 1 and the method described in reference to FIG. 2 above. In particular, the examples described in FIGS. 3.1-3.5 focus on HTTP based malware and to detect malicious HTTP activities from server side. For example, the malicious HTTP activities may include communication activity and attacking activity. Communication activity is the activity that malware attempts to communicate with malicious servers (identified as IPs and/or domains) while attacking activity is the activity that malware attempts to attack benign servers (identified as IPs and/or domains).

In the examples described in FIGS. 3.1-3.5, one main dimension and three secondary dimensions are used to characterize the relationships among servers, and to generate groups of servers referred to as the associated server herds (ASHs). The ASHs are examples of the main subsets (131) and secondary subsets A (132a), secondary subsets B (132b) described in reference to FIG. 1 above. Specifically, the ASHs are generated using criteria based on the main dimension plus one or more secondary dimensions. In particular, client similarity is used as the main dimension and is based on the heuristics that malicious servers belonging to the same attack campaigns are connected by the same or similar set of infected clients. In addition, the secondary dimensions include the file similarity, IP similarity, and Whois similarity. The file similarity is based on the heuristics that malicious servers belonging to the same attack campaigns are requested with same/similar files (e.g., vulnerable files or exploit scripts). Whois is an example of the domain registration information, Specifically, Whois is a query and response protocol that is documented in RFC 3912 for querying databases that store the registered users or assignees of an Internet resource, such as a domain name, an IP address block, or an autonomous system. The IP similarity and Whois similarity are based on the heuristics that malicious servers belonging to the same campaign usually share same IP addresses or domain registration information. Although each of these main and secondary dimensions alone is not sufficient to distinguish malicious severs from benign servers, a pre-determined combination of these dimensions is used to generate associated server herds involved in attack campaigns.

Although the example described in FIGS. 3.1-3.5 uses three secondary dimensions, additional secondary dimension may be added, such as a measure of similarity of payload downloaded from each server. Based on the main dimension and the extensible set of secondary dimensions, the network traffic is used as input data to automatically generate attack campaigns in an unsupervised data mining approach. In particular, in this unsupervised data mining approach, the more dimensions a group of servers correlate among themselves, the higher probability this group of servers is an associated group involved in malicious activities.

FIG. 3.1 shows an example operations flow diagram (310) where HTTP network traffic (311) is captured as input to generate one or more ASHs using spectral clustering for the main dimension and for each of the secondary dimensions. A malicious ASH is then detected by correlating these ASHs. Instead of detecting a single malicious server in isolation, ASHs are determined by analyzing at the global network view in the operations flow diagram (310).

As shown in FIG. 3.1, the HTTP network traffic (311) is processed by five components of the operations flow diagram (310), namely traffic preprocessing (i.e., block (312)), ASH inference (i.e., block (313)), ASH correlation (i.e., block (314)), pruning (i.e., block (315)), and attack campaign inference (i.e., block (316)). Each of these components is described below. In one or more embodiments, the HTTP network traffic (311) is an example of the network traffic data (130) described in reference to FIG. 1 above, the combination of traffic preprocessing (312) and ASH inference (313) is an example of the main similarity analyzer (124) and secondary similarity analyzer (125) described in reference to FIG. 1 above, ASH correlation (314) is an example of the correlation analyzer (126) described in reference to FIG. 1 above, and attack campaign inference (316) is an example of the attack campaign inference engine (127) described in reference to FIG. 1 above.

In block (312), traffic preprocessing is performed to reduce the traffic to be analyzed. In particular, benign severs are excluded from the analysis based on the popularity of those servers. During the traffic preprocessing, two steps are performed to compress the number of servers found in the HTTP network traffic (311). Specifically, all full domains are aggregated to their second level sub-domains (e.g., leading to 60% reduction of all servers under analysis) based on the reasoning that domains with same second-level domains belong to the same ASH, thus there is no need to differentiate them. In addition to aggregating domains, benign servers are excluded based on their popularity. The inverse document frequency ("IDF") is used as a measure to represent the "popularity" of servers. The popularity is defined as the number of clients that connected to the server. The more clients the server is connected to, the higher the popularity the server has. In an example data set, approximately 90% of servers involved in malicious activities have IDF value less than 10 clients. Accordingly, a minimum threshold substantially larger than 10 (e.g., 200) may be used to exclude very popular servers (i.e., servers having IDF exceeding the threshold) but still keep the majority (e.g., 99%) of all the servers in the data set to be analyzed.

In Block (313), ASH inference is performed by forming clusters of similar servers (i.e., ASHs) considering each different individual dimension, using spectral clustering methods. The ASH inference is an example of Step 201 through Step 204 described in reference to FIG. 2 above.

In Block (314), ASH correlation is performed to find the ASHs that are possibly involved in malicious activities. ASH correlation extracts the ASHs that appear in multiple dimensions, and assigns different weights to each ASH based on the dimension combination each ASH appears in. The more dimensions an ASH appeared in, the higher possibility it belongs to an attack campaign. The ASH correlation is an example of the Step 205 through Step 209 described in reference to FIG. 2 above.

In Block (315), pruning is performed to remove insignificant ASHs. For example, noisy ASHs may be removed by checking HTTP redirection chain and HTTP referrer relationship among servers in each ASH. All servers that appear in redirection chain are represented by the landing server of redirection chain, and all servers sharing same referrer are represented by the referrer server. Other pruning methods may also be used.

In Block (316), attack campaign inference is performed. In Block (314), compact ASHs are generated in the ASH correlation process that may be overly specific to represent the entire attack campaigns. The attack campaign inference rebuilds the general attack campaigns among those inferred ASHs relying on the main dimension. The attack campaign inference is an example of the Step 210 described in reference to FIG. 2 above.

Additional details of Blocks (313) through (316) are described below.

The ASH inference performed in Block (313) uses one main dimension (313a) and three secondary dimensions (313b) to characterize the similarities among the servers to infer ASHs. Specifically, client similarity is used as the main dimension (313a). Client similarity between two servers depends on the set of clients contacting the two servers. Mathematically, the client similarity between server $S_i$ and server $S_j$ is defined as:

$$\text{Client}(S_i, S_j) = \frac{|C_{Si} \cap C_{Sj}|}{|C_{Si}|} * \frac{|C_{Sj} \cap C_{Sj}|}{|C_{Sj}|} \qquad (1)$$

where $C_{Si}$ represents the set of clients contacting server $S_i$. The server $S_i$ and server $S_j$ is referred to as a server pair. The ratio $$\frac{|C_{Si} \cap C_{Sj}|}{|C_{Si}|}$$

represents how important the common clients for server $S_i$. Thus, two servers are similar only when their common clients are both important to the two servers. Since malicious servers are usually not connected by benign clients, and infected clients usually connect to a same set of servers, two severs sharing similar sets of clients are determined as belonging to the same ASH.

To extract ASH from all servers analyzed based on the client similarity, a communication graph G=(V,E) is defined where V denotes the set of all the servers, and each edge (i, j)∈E denotes that server i and server j share a set of clients. The weight assigned to each edge represents the client similarity between two servers connected by the edge in G. From the communication graph G, ASHs are extracted using graph based clustering. For example, modularity may be used to measure the quality of a given partition of G into clusters. A high quality (or good) partition is defined as one in which the number of edges crossing boundaries of clusters is small. Different methods may be used to calculate modularity. An example method calculates the modularity of a given partition of G as a scalar value representing the density of edges inside clusters as compared to the density of edges between clusters. The higher the modularity, the higher the quality of the given partition.

A graph based clustering algorithm is used to automatically find high modularity partitions of G. For example, the particular partition that has the highest modularity may be selected where the clusters of this selected partition are referred to as ASHs for the main dimension.

FIG. 3.2 shows an example weighted graph (320) that are partitioned into two clusters as either the partition A (321a) or the partitioned B (321b). In the partition A (321a), the graph (320) is partitioned into the clusters referred to as ASH 1 (322a) and ASH 2 (322b). In the partition B (321b), the graph (320) is partitioned into clusters referred to as G1 (323a) and G2 (323b). Although only two partitions are shown in FIG. 3.2, additional partitions may also be possible. For example, the partition A (321a) may be selected as the partition having the highest quality measure of modularity=0.17545. Accordingly, the clusters of the partition A (321a) are determined to be the associated group of servers.

Returning to the discussion of FIG. 3.1, for the ASH inference performed in Block (313), the three secondary dimensions (313b) include file similarity, IP similarity and Whois similarity. File similarity is based on the heuristics that multiple servers involved in the same malicious activities share similar/same files. For example, web attack may target certain vulnerable files. As a result, different targeted servers share same file names. For the malicious servers, attackers may use same scripts to handle the requests from infected clients. As a result, the malicious servers may also share same files. To calculate file similarity, all the files of servers are extracted by checking all the HTTP requests. The file name are defined as the substring of URI that starting from the last '/', which are files or scripts used for handling clients' requests. For example, in www.example.com/ns1/file.php, the substring file.php is the file name.

FIG. 3.3 shows the obfuscated file name A (332a) and obfuscated file name B (332b) used by an attacker for different malicious servers (identified by the server name A (331a) and server name B (331b)) involved in the same attack campaign. For example, the character distribution of obfuscated file name A (332a) includes one a, four b's, three c's, etc. The character distribution of obfuscated file name B (332b) includes two a's, three b's, eight c's. etc.

Returning to the discussion of FIG. 3.1, the file similarity between two files is defined as followings. If the length of file name is shorter than a pre-determined length "len", the similarity function is defined as:

$$sim(f_i, f_j) = \begin{cases} 1 & \text{if } f_i = f_j, \\ 0 & \text{otherwise.} \end{cases} \quad (2)(3)$$

Based on this definition, two files are similar only if they are exactly the same since short names usually are not obfuscated. However, if the length of file name is longer than pre-determined length "len", the similarity function is defined as:

$$sim(f_i, f_j) = \begin{cases} 1 & \text{if } \cos(\theta) > 0.8, \\ 0 & \text{otherwise.} \end{cases} \quad (4)(5)$$

where $$\cos(\theta) = \frac{(CharSet_{f_i} \cdot CharSet_{f_j})}{\|CharSet_{f_i}\| * \|CharSet_{f_j}\|} \quad (6)$$

Based on this definition, for long file names, the file similarity is based on the character distribution of the file names. Two file names are similar as long as their names have similar character distributions. In particular, the file similarity equals 1 for the exactly same long file names. The file similarity is then used to measure the relationship among the servers. Since one server may be requested with multiple files, the file similarity between two servers is defined as:

$$\text{File }(S_i, S_j) = \left(\frac{1}{M}\sum_m \max_n(Sim(f_{sim}, f_{sjn}))\right) * \left(\frac{1}{N}\sum_n \max_m(Sim(f_{sjn}, f_{sim}))\right)$$

Where $f_{Sim}$ is the mth file from server $S_i$, M and N are the number of files from $S_i$ and $S_j$, respectively.

Similar to the client similarity, the left hand side of the equation (7) represents the importance of similar files to server $S_i$, and the right hand side of the equation (7) represents the importance of similar files to server $S_j$. Based on this definition, if two servers share sufficient number of similar files, the two servers are determined as involved in the same activities, and included in the same ASH. In an example data set, 85% of files have file names shorter than 25 characters. Accordingly, the pre-determined length "len" may be set to equal 25 as the threshold.

IP Similarity is based on the heuristics that malicious domains may share similar set of IP addresses. For example, malicious servers may use fast flux to evade domain based detection, thus two domains may share same IP address. Similar to client similarity, the IP similarity is defined as:

$$IP(S_i, S_j) = \frac{|I_{S_i} \cap I_{S_j}|}{|I_{S_i}|} * \frac{|I_{S_j} \cap I_{S_i}|}{|I_{S_j}|} \quad (8)$$

In equation (8), $I_{S_i}$ is the set of destination IPs associated with the server $S_i$, and $I_{S_j}$ is the set of destination IPs associated with the server $S_j$. Based on this definition, if two servers share similar IP addresses, the tow servers may be involved in the same activities, and should be in the same ASH.

Whois Similarity is based on the heuristics that malicious servers may be registered using similar domain registration information, such as registerant name, home address, email address, phone number and name servers. FIG. 3.4 shows the whois information of two malicious servers identified by server name A (341a) and server name B (342a). Although the two malicious servers have different registers (e.g., registerant name (341b)), the two malicious servers share same home address (e.g., home address (341c)), phone number (e.g., phone number (341d)), and name servers (e.g., name servers (342b)). The whois similarity of two servers is defined as the number (or fraction) of shared fields in the Whois information of the two servers.

Similar to the communication graph G for the main dimension, for each of the secondary dimensions, a similarity graph G'=(V,E') is defined where V denotes the set of all the servers, and each edge (i, j)∈E' denotes that server i and server j have a non-zero similarity measure (e.g., file similarity, IP similarity, or Whois similarity). The weight assigned to each edge represents the similarity between two servers connected by the edge in G'. For the similarity graph G' of each secondary dimension, ASHs are extracted using graph based clustering in a similar fashion as the main dimension. In other words, the same graph based clustering algorithm is used to automatically find high modularity partitions of G' for each secondary dimension. For example, the particular partition of G' that has the highest modularity for a particular secondary dimension may be selected to identify the nodes remaining connected within each cluster to form ASHs for the particular secondary dimension.

The ASH correlation performed in Block (314) correlates the ASHs generated from different dimensions. The ASH correlation starts with generating a joint set (referred to as a joint ASH) between an ASH from the main dimension and another ASH from one of the secondary dimensions. Specifically, $(ASH_j^d \cap ASH_i^m)$ forms a joint ASH that is the joint set of an $i^{th}$ ASH, $ASH_i^m$, from main dimension m and a $j^{th}$ ASH, $ASH_j^d$, from a secondary dimension d. The suspicious score for each server in the joint ASH is defined as following:

$$S(S_i) = \sum_{d \in Sec\_Dimensions} w_d(C_{S_i}^d) w_m(C_{S_i}^m) \Phi(|C_{S_i}^d \cap C_{S_i}^m|) \quad (9)$$

In equation 9, $$\Phi(x) = \frac{1}{2}\left(1 + \text{erf}\left(\frac{x}{\gamma}\right)\right), \text{ erf }(\cdot)$$

is the "S" shaped Gaussian error function and γ is a pre-determined (e.g., user specified) parameter and is set to 5.5 in an example scenario. In the equation (9), $C_{S_i}^d$ represents an ASH from a secondary dimension d that includes server $S_i$, $C_{S_i}^m$ represents an ASH from the main dimension m that includes server $S_i$, $w_d(C_{S_i}^d)$ represents the density of the ASH $C_{S_i}^d$, and $\omega_m(C_{S_i}^m)$ represents the density of the ASH $C_{S_i}^m$. Density of an ASH is measured as the number of edges in the ASH over the maximal number of possible edges in the ASH. Mathematically, the density may be calculated as (2\*|e|/(|v|\* (|v|−1)) where |e| represents the number of edges and |v| represents number of nodes.

FIG. 3.5 shows two example paragraphs, namely the graph 1 (331) having 10 edges and graph 2 (332) having 5 edges. The density of graph 1 (331) is then calculated as 10/{(5\*4)/ 2}=1. Similarly, the density of graph 2 (332) is calculated as 5/{(5\*4)/2}=0.5.

Returning to the discussion of FIG. 3.1, the ASH with higher density is determined as having higher possibility of belonging to a malicious group. When the suspicious score is determined for each server in the joint ASH, all the servers with scores below a pre-determined threshold are removed from the joint ASH. Any joint ASH with only one server remained is excluded from further analysis. The term $\Phi(|C_{S_i}^d \cap C_{S_i}^m|)$ in equation (9) contributes to the suspicious score based on the size of the joint ASH. In particular, the group with larger number of servers has higher suspicious score based on equation (9). The smaller value of $|C_{S_i}^d \cap C_{S_i}^m|$ means there are a smaller number of servers in this joint ASH, leading to less confidence in determining whether it is malicious or not based on the particular secondary dimension d. In equation (9), the contribution from this particular secondary dimension d to the suspicious score is reduced according to the lesser degree of confidence. The "S" shaped Gaussian error function transforms $|C_{S_i}^d \cap C_{S_i}^m|$ into a value between 0 and 1.

To perform pruning in Block (315), two types of noise ASH are defined as RedirectionGroup and ReferrerGroup. The Redirection Group refers to servers associated with each other because they are belong to the same redirection chain, thus they usually share exactly same sets of clients, same IP addresses and sometimes same paths. The Referrer Group refers to servers associated with each other because they are referred by the same landing server (e.g., landing websites are embedded with other websites). To reduce false detection of malicious servers due to these two types of noise servers without missing malicious servers, instead of directly excluding the RedirectionGroup and RefererGroup, the landing servers are used to replace all servers in the same redirection chain and all the referred servers in Referer Group. The heuristics is based on that for either Redirection Group or Referrer Group, if one client visits the landing servers, it will automatically visit other severs in redirection chain or servers embedded in landing server, thus, landing server may be used to represent those servers. The redirection chain is collected by directly sending HTTP requests to each server in associated server herds, and collect referrer information by extracting the HTTP field "referrer" from input network traffic. Thus, after pruning process, if there still exist more than one server in that ASH, the ASH is inferred as malicious ASH. Although the pruning method described above uses a specific heuristics, different heuristics or algorithms may also be used.

In certain scenarios, ASH correlation process may only represent a specific portion of malicious activities, instead of the malicious activities in the entirety. For example, bots may initially download encrypted files from some servers, and then connect to other C&C servers. In this case, ASH correlation process may separate these two processes into two different ASHs or joint ASHs leading to difficulties in analyzing file downloading activities. To address these scenarios, a further refinement step rebuilds original attack campaign based on the main dimension. Two malicious joint ASHs are merged together if it is determined that their servers are in the same joint ASH for the main dimension. This heuristics is based on the rationale that the main dimension captures the group connection behaviors of malicious activities. Using this heuristics, the infected clients are determined to belong to the same attach campaign even though the infected clients may connect to different files or different IPs causing them to be in two separate joint ASH.

Figure 4:
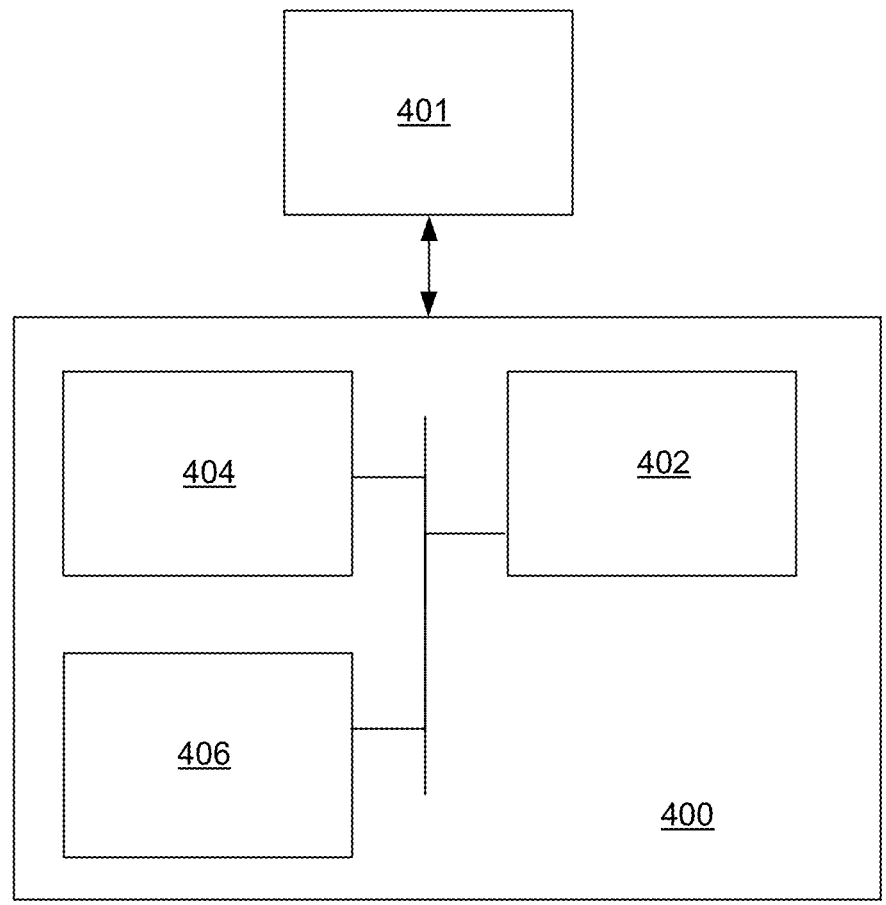
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting malicious servers, comprising:
analyzing, by a processor of a computer system, network traffic data to generate a main similarity measure for each server pair of a plurality of servers found in the network traffic data, wherein the main similarity measure represents first similarity between two servers of the server pair based on a plurality of clients found in the network traffic data that communicate to both of the two servers using at least a portion of the network traffic data;
extracting, by the processor and based on a first pre-determined algorithm, a main subset representing a portion of the plurality of servers based on the main similarity measure;
analyzing, by the processor, the network traffic data to generate a plurality of secondary similarity measures for each server pair of the plurality of servers, wherein a secondary similarity measure of the plurality of secondary similarity measures represents second similarity between the two servers of the server pair based on a pre-determined criterion;
extracting, by the processor and based on a second pre-determined algorithm, a secondary subset representing another portion of the plurality of servers based on the secondary similarity measure;
identifying a server of the plurality of servers that belongs to the main subset and the secondary subset; and
determining, by the processor, a suspicious score of the server based on at least a first similarity density measure of the main subset, a second similarity density measure of the secondary subset, and a commonality measure of the main subset and the secondary subset.

2. The method of claim 1, further comprising:
determining, based at least on the suspicious score, a joint set of the main subset and the secondary subset as an associated group of the malicious servers collectively engaging in a malicious HTTP activity,
wherein the network traffic data comprises HTTP traffic data.

3. The method of claim 2, further comprising:
extracting, based on the second pre-determined algorithm, another secondary subset of the plurality of servers based on one of the plurality of secondary similarity measures, wherein the one of the plurality of secondary similarity measures is same as or separate from the secondary similarity measure;
determining another joint set of the main subset and the another secondary subset as another associated group of the malicious servers collectively engaging in another malicious HTTP activity;
merging, subsequent to determining the joint set as the associated group of the malicious servers and determining the another joint set as the another associated group of the malicious servers, the joint set and the another joint to generate an aggregate joint set; and
determining, in response to the merging, the malicious HTTP activity and another malicious HTTP activity as portions of a single malicious attack campaign.

4. The method of claim 2, further comprising:
identifying the server as further belonging to an additional number of secondary subsets each extracted based on one of the plurality of secondary similarity measures that is separate from the secondary similarity measure,
wherein determining the suspicious score of the server is further based on the second similarity density measure of each of the additional number of secondary subsets and the commonality measure of the main subset and each of the additional number of secondary subsets, and
wherein the suspicious score is proportional to a count of the additional number of secondary subsets.

5. The method of claim 1, wherein the pre-determined criterion for generating the secondary similarity measure comprises at least one selected from a group consisting of file similarity, IP similarity, and domain registration similarity between the two servers.

6. The method of claim 1, wherein extracting the main subset of the plurality of servers comprises:
representing the plurality of servers as nodes in a graph having edges each weighted by the main similarity measure of a corresponding server pair; and
partitioning the graph into a plurality of clusters by maximizing a modularity of the plurality of clusters,
wherein the main subset is one of the plurality of clusters, and
wherein the first similarity density measure of the main subset comprises a count of the edges in the graph divided by a maximum number of possible edges in the graph.

7. The method of claim 1, wherein extracting the secondary subset of the plurality of servers comprises:
representing the plurality of servers as nodes in a graph having edges each weighted by the secondary similarity measure of a corresponding server pair; and
partitioning the graph into a plurality of clusters by maximizing a modularity of the plurality of clusters,
wherein the secondary subset is one of the plurality of clusters, and
wherein the second similarity density measure of the secondary subset comprises a count of the edges in the graph divided by a maximum number of possible edges in the graph.

8. A system for detecting malicious servers, comprising:
a processor of a computer system;
memory comprising instructions executable by the processor, wherein the instructions comprises:
a main similarity analyzer configured to:
analyze network traffic data to generate a main similarity measure for each server pair of a plurality of servers found in the network traffic data, wherein the main similarity measure represents first similarity between two servers of the server pair based on a plurality of clients found in the network traffic data that communicate with both of the two servers using at least a portion of the network traffic data; and
extract, based on a first pre-determined algorithm, a main subset representing a portion of the plurality of servers based on the main similarity measure;
a secondary similarity analyzer configured to:
analyze the network traffic data to generate a plurality of secondary similarity measures for each server pair of the plurality of servers, wherein a secondary similarity measure of the plurality of secondary similarity measures represents second similarity between the two servers of the server pair based on a pre-determined criterion; and
extract, based on a second pre-determined algorithm, a secondary subset representing another portion of the plurality of servers based on the secondary similarity measure; and
a correlation analyzer configured to:
identify a server of the plurality of servers that belongs to the main subset and the secondary subset; and
determine a suspicious score of the server based on at least a first similarity density measure of the main subset, a second similarity density measure of the secondary subset, and a commonality measure of the main subset and the secondary subset; and a repository configured to store the main subset, the secondary subset, the first similarity density measure of the main subset, the second similarity density measure of the secondary subset, and the commonality measure of the main subset and the secondary subset.

9. The system of claim 8, further comprising an attack campaign inference engine configured to:
determine, based at least on the suspicious score, a joint set of the main subset and the secondary subset as an associated group of the malicious servers collectively engaging in a malicious HTTP activity,
wherein the network traffic data comprises HTTP traffic data.

10. The system of claim 9,
wherein the secondary similarity analyzer is further configured to:
extract, based on the second pre-determined algorithm, another secondary subset of the plurality of servers based on one of the plurality of secondary similarity measures, wherein the one of the plurality of secondary similarity measures is same as or separate from the secondary similarity measure, and
wherein the correlation analyzer is further configured to:
determine another joint set of the main subset and the another secondary subset as another associated group of the malicious servers collectively engaging in another malicious HTTP activity;
merge, subsequent to determining the joint set as the associated group of the malicious servers and determining the another joint set as the another associated group of the malicious servers, the joint set and the another joint to generate an aggregate joint set; and
determine, in response to the merging, the malicious HTTP activity and another malicious HTTP activity as portions of a single malicious attack campaign.

11. The system of claim 9, wherein the correlation analyzer is further configured to:
identify the server as further belonging to an additional number of secondary subsets each extracted based on one of the plurality of secondary similarity measures that is separate from the secondary similarity measure,
wherein determining the suspicious score of the server is further based on the second similarity density measure of each of the additional number of secondary subsets and the commonality measure of the main subset and each of the additional number of secondary subsets, and
wherein the suspicious score is proportional to a count of the additional number of secondary subsets.

12. The system of claim 8, wherein the pre-determined criterion for generating the secondary similarity measure comprises at least one selected from a group consisting of file similarity, IP similarity, and domain registration similarity between the two servers.

13. The system of claim 8, wherein extracting the main subset of the plurality of servers comprises:
representing the plurality of servers as nodes in a graph having edges each weighted by the main similarity measure of a corresponding server pair; and
partitioning the graph into a plurality of clusters by maximizing a modularity of the plurality of clusters,
wherein the main subset is one of the plurality of clusters, and
wherein the first similarity density measure of the main subset comprises a count of the edges in the graph divided by a maximum number of possible edges in the graph.

14. The system of claim 8, wherein extracting the secondary subset of the plurality of servers comprises:
representing the plurality of servers as nodes in a graph having edges each weighted by the secondary similarity measure of a corresponding server pair; and
partitioning the graph into a plurality of clusters by maximizing a modularity of the plurality of clusters,
wherein the secondary subset is one of the plurality of clusters, and
wherein the second similarity density measure of the secondary subset comprises a count of the edges in the graph divided by a maximum number of possible edges in the graph.

15. A non-transitory computer readable medium embodying instructions for detecting malicious servers, the instructions when executed by a processor comprising functionality for:
analyzing network traffic data to generate a main similarity measure for each server pair of a plurality of servers found in the network traffic data, wherein the main similarity measure represents first similarity between two servers of the server pair based on a plurality of clients found in the network traffic data that communicate to both of the two servers using at least a portion of the network traffic data;
extracting, based on a first pre-determined algorithm, a main subset representing a portion of the plurality of servers based on the main similarity measure;
analyzing the network traffic data to generate a plurality of secondary similarity measures for each server pair of the plurality of servers, wherein a secondary similarity measure of the plurality of secondary similarity measures represents second similarity between the two servers of the server pair based on a pre-determined criterion;
extracting, based on a second pre-determined algorithm, a secondary subset representing another portion of the plurality of servers based on the secondary similarity measure;
identifying a server of the plurality of servers that belongs to the main subset and the secondary subset; and
determining a suspicious score of the server based on at least a first similarity density measure of the main subset, a second similarity density measure of the secondary subset, and a commonality measure of the main subset and the secondary subset.

16. The non-transitory computer readable medium of claim 15, the instructions when executed by the processor further comprising functionality for:
determining, based at least on the suspicious score, a joint set of the main subset and the secondary subset as an associated group of the malicious servers collectively engaging in a malicious HTTP activity,
wherein the network traffic data comprises HTTP traffic data.

17. The non-transitory computer readable medium of claim 16, the instructions when executed by the processor further comprising functionality for:
extracting, based on the second pre-determined algorithm, another secondary subset of the plurality of servers based on one of the plurality of secondary similarity measures, wherein the one of the plurality of secondary similarity measures is same as or separate from the secondary similarity measure;
determining another joint set of the main subset and the another secondary subset as another associated group of the malicious servers collectively engaging in another malicious HTTP activity;
merging, subsequent to determining the joint set as the associated group of the malicious servers and determining the another joint set as the another associated group of the malicious servers, the joint set and the another joint to generate an aggregate joint set; and
determining, in response to the merging, the malicious HTTP activity and another malicious HTTP activity as portions of a single malicious attack campaign.

18. The non-transitory computer readable medium of claim 16, the instructions when executed by the processor further comprising functionality for:
identifying the server as further belonging to an additional number of secondary subsets each extracted based on one of the plurality of secondary similarity measures that is separate from the secondary similarity measure,
wherein determining the suspicious score of the server is further based on the second similarity density measure of each of the additional number of secondary subsets and the commonality measure of the main subset and each of the additional number of secondary subsets, and
wherein the suspicious score is proportional to a count of the additional number of secondary subsets.

19. The non-transitory computer readable medium of claim 15, wherein the pre-determined criterion for generating the secondary similarity measure comprises at least one selected from a group consisting of file similarity, IP similarity, and domain registration similarity between the two servers.

20. The non-transitory computer readable medium of claim 15, wherein extracting the main subset of the plurality of servers comprises:
representing the plurality of servers as nodes in a graph having edges each weighted by the main similarity measure of a corresponding server pair; and
partitioning the graph into a plurality of clusters by maximizing a modularity of the plurality of clusters,
wherein the main subset is one of the plurality of clusters, and
wherein the first similarity density measure of the main subset comprises a count of the edges in the graph divided by a maximum number of possible edges in the graph.

* * * * *